United States Patent [19]

Van Der Giessen et al.

[11] Patent Number: 4,673,427
[45] Date of Patent: Jun. 16, 1987

[54] METHOD OF AND DEVICE FOR DRAWING AN OPTICAL FIBER FROM A SOLID PREFORM CONSISTING SUBSTANTIALLY OF $SiO_2$ AND DOPED $SiO_2$

[75] Inventors: Aart A. Van Der Giessen; Victor A. Van Der Hulst; Petrus J. Janssen, all of Eindhoven, Netherlands

[73] Assignee: U.S. Philips Corporation, New York, N.Y.

[21] Appl. No.: 536,483

[22] Filed: Sep. 28, 1983

[30] Foreign Application Priority Data

Oct. 4, 1982 [NL] Netherlands .......................... 8203843

[51] Int. Cl.[4] .......................................... C03B 37/027
[52] U.S. Cl. .......................................... 65/2; 65/3.12; 65/12; 65/13; 65/32
[58] Field of Search ................... 65/2, 13, 32, 12, 3.12

[56] References Cited

U.S. PATENT DOCUMENTS

| | | | |
|---|---|---|---|
| 4,030,901 | 6/1977 | Kaiser | 65/2 |
| 4,101,300 | 7/1978 | Imoto et al. | 65/2 |
| 4,174,842 | 11/1979 | Partus | 65/2 X |
| 4,304,582 | 12/1981 | Aussenegg et al. | 65/12 |

FOREIGN PATENT DOCUMENTS 197706 6/1977 U.S.S.R. .................. 65/13

OTHER PUBLICATIONS

American Ceramic Society Bulletin, vol. 55, No. 2, pp. 195-197, 2/1976, Payne et al.

Primary Examiner—Robert Lindsay
Attorney, Agent, or Firm—Marc D. Schechter

[57] ABSTRACT

Optical fibres are drawn from a solid preform which consists substantially of $SiO_2$ and doped $SiO_2$. After leaving the heating zone, the fiber is guided through a space having a laminar gas flow to restrict the temperature drop across the fiber so that no extra stresses are incorporated in the fiber upon cooling. A device for performing this method comprises a quartz pipe through which the fiber is guided and in which a laminar gas flow is maintained.

7 Claims, 1 Drawing Figure

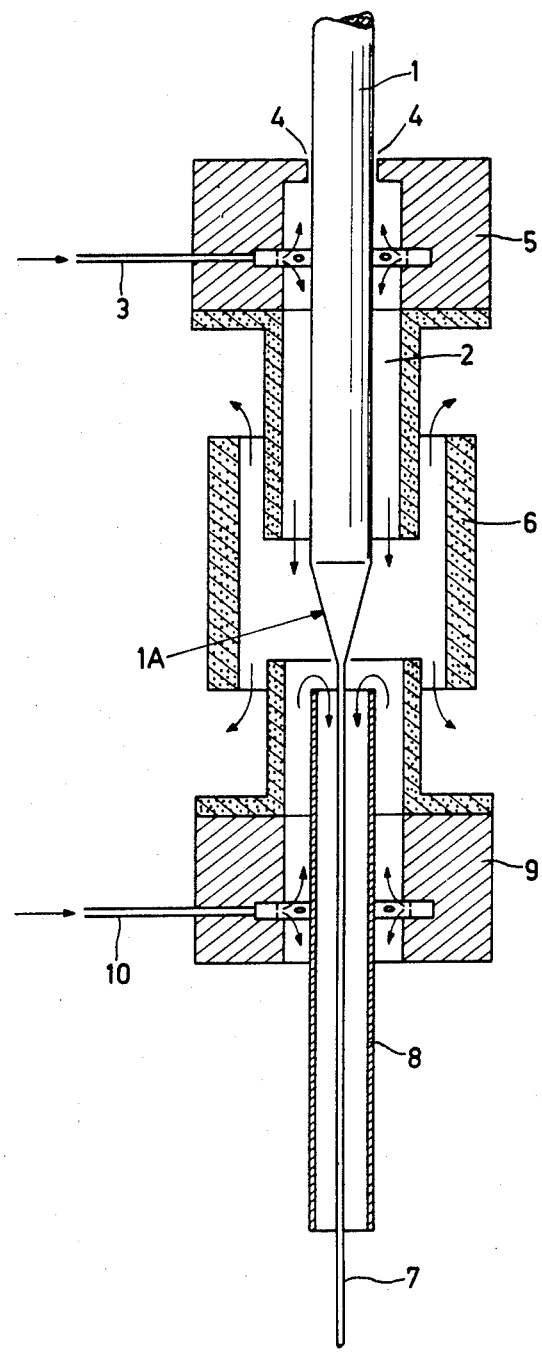

METHOD OF AND DEVICE FOR DRAWING AN OPTICAL FIBER FROM A SOLID PREFORM CONSISTING SUBSTANTIALLY OF SIO₂ AND DOPED SIO₂

BACKGROUND OF THE INVENTION

The invention relates to a method of and a device for drawing an optical fiber from a silica or doped silica preform.

In drawing an optical fiber from a solid preform, the preform is guided through a cylindrical furnace. The conical end of the preform, from which the fiber is drawn, is heated at a temperature above 2000° C. The fiber is then guided through a device in which a thin layer of a synthetic resin is provided on the fiber, and is then guided through a furnace in which a solvent is removed from the synthetic resin and/or the layer of synthetic resin is polymerized.

It has been found that when the drawing speed is increased the attenuation of an optical fiber and the bandwidth can increase.

It is presumed that the increase in attenuation is the result of extra stresses which are present in a fiber and which are caused by volume relaxation and structure orientation. These stresses occur in particular if the temperature gradient traversed upon cooling the fiber in the temperature range from 1200° to 1800° C. is particularly large (larger than 500° C. per sec.).

SUMMARY OF THE INVENTION

It is an object of the invention to provide a method of and a device for drawing optical fiber which diminishes stresses in the fibre such that when the drawing speed is increased the attenuation in the fiber does not increase unacceptably.

According to the invention this object is achieved by a method in which the optical fiber drawn from the conical end of the preform is guided through a cooling space. In the cooling space, the drops in temperature across the cross-section of the fiber at right angles to the direction of drawing and in the direction of drawing are smaller than the temperature drop at which glass stresses increase the optical attenuation. In practice this can be accomplished, for example, by producing a laminar gas flow of a temperature not differing considerably from the fiber temperature along the fiber at a speed at the surface of the fiber equal to or slightly different from the fiber speed. In certain circumstances, however, a turbulent gas flow may also be used, provided the gas has a homogeneous temperature.

The temperature of the gas which comes in contact with the fiber surface preferably differs less than 200° C. from the fiber temperature. The length and the cross-section of the space through which the fiber is guided—which in a practical embodiment is surrounded by a quartz tube—depends on the drawing rate and the cooling effect of the gas flow in question through the space. It is has been found that the desired effect is already achieved if the fiber is in the space at least 0.1 second and there is a quiet laminar gas flow.

In practice this means, for example, that at a drawing rate of approximately 60 meters per minute, the length of the space is at least 10 cm. At a drawing rate of 300 meters per minute, it is at least 50 cm.

The gas which is led through the space may be, for example, nitrogen, argon or oxygen, dependent on the furnace material. The furnace material may not be attacked by the gas at the furnace temperature during drawing. In the ideal case, the gas flow in the space through which the fiber is guided, is determined substantially by the speed at which the fiber is guided through the space.

According to the invention a device for drawing an optical fiber from a solid preform comprises a cylindrical drawing tube and an inlet duct to lead a gas through the cylindrical heating space to the tube. The fiber is guided through the tube after leaving the cylindrical heating space.

BRIEF DESCRIPTION OF THE DRAWING

The sole drawing FIGURE is a schematic representation of the optical fiber drawing device according to the invention.

DESCRIPTION OF THE PREFERRED EMBODIMENTS

A preform 1 consisting of SiO₂ and a core of doped SiO₂, for example GeO₂-doped SiO₂, is guided a first cylindrical space 2. A gas is led into space 2 by way of inlet duct 3. The gas flow can escape both upward and downward, but the flanges 4 of the tubular body 5 surrounding the space 2 ensure that the gas flows away substantially downward.

With preform 1, the gas flow reaches the actual drawing furnace consisting of a cylindrical body 6 of conductive material, for example graphite. The graphite is heated by means of an electrical current (not further shown in the drawing). The preform is heated in the furnace at 2100° C., while the gas is also heated to a high temperature as a result of thermal conductivity.

Via the duct 10 at the lower side of the cylindrical body 9, gas is also led upward into the drawing furnace 6. In the embodiment shown in the drawing the gas has a downward leakage current.

The gas with the fiber 7 then passes into the quartz tube 8. The flow rate is controlled so that the gas has a laminar flow profile in tube 8. At a drawing rate of 1 m/sec. the fibre temperature at the outlet of the quartz tube 8 was: 1650° C.

In a practical embodiment the gas blown in via the ducts 3 and 10 is argon.

A reduction of the attenuation by approximately 16% was realized by means of the embodiment of the device described.

What is claimed is:
1. A method of drawing an optical fiber from a solid preform comprising SiO₂ and doped SiO₂, said method comprising the steps of:
   heating an end of the preform to a temperature above 2000° C. in a furnace;
   drawing an optical fiber from the heated end of the preform out of the furnace; and
   flowing a gas through the furnace to heat the gas to substantially the temperature of the fiber at the end of the preform, and then flowing the hot gas out of the furnace along the fiber at substantially the same speed as the fiber is drawn from the furnace, wherein the gas flow is laminar flow and the ggs flows along the fiber for a selected time and distance chosen to assure that the temperature gradient in the fiber is always less than that at which stresses are produced which would increase the optical attenuation of the fiber.

2. A method as claimed in claim 1, wherein each portion of the fiber passes through the gas flow for at least 0.1 second.

3. A method as claimed in claim 2, wherein the gas does not attack the furnace material.

4. A method as claimed in claim 2, wherein the gas is heated in the furnace to a temperature within 200° C. of the fiber temperature.

5. A method as claimed in claim 1, wherein the gas is heated in the furnace to a temperature within 200° C. of the fiber temperature.

6. A device for drawing an optical fiber from a solid preform comprising $SiO_2$ and doped $SiO_2$, said device comprising:

means for heating an end of the preform to a temperature at which an optical fiber can be drawn from the preform;

means for drawing an optical fiber from the heated end of the preform out of the heating means;

means for flowing a gas through the heating means to heat the gas to substantially the temperature of the fiber at the end of the preform, and then flowing the hot gas out of the heating means along the fiber at substantially the same speed as the fiber is drawn from the heating means, wherein the gas flow is laminar flow and the gas flows along the fiber for a selected time and distance chosen to assure that the temperature gradient in the fiber is always less than that at which stresses are produced which would increase the optical attenuation of the fiber.

7. A device as claimed in claim 6, wherein the means for flowing the gas out of the furnace along the fiber comprises a quartz tube.

* * * * *

UNITED STATES PATENT AND TRADEMARK OFFICE
CERTIFICATE OF CORRECTION

PATENT NO. : 4,673,427

DATED : June 16, 1987

INVENTOR(S) : Aart A. Van Der Giessen ET AL

It is certified that error appears in the above-identified patent and that said Letters Patent is hereby corrected as shown below:

Claim 1, line 13 (column 2, line 63), "ggs" should read --gas--

Signed and Sealed this

Sixth Day of October, 1987

*Attest:*

DONALD J. QUIGG

*Attesting Officer*  *Commissioner of Patents and Trademarks*